з,061,483
Patented Oct. 30, 1962

3,061,483
COATING OF METAL WITH LAYERS OF TITANIUM ESTERS AND A POLYMER BY EXPOSURE TO HIGH ENERGY IRRADIATION

Harold W. Coles, Framingham, Mass., and Stanley E. Rohowetz, Madison, Wis., assignors, by direct and mesne assignments, to the United States of America as represented by the Secretary of the Army
No Drawing. Filed Nov. 23, 1956, Ser. No. 623,786
8 Claims. (Cl. 148—6.14)

This invention relates to the protection of metals and particularly to the protection of magnesium.

Heretofore, it has been very difficult to accomplish in a practical manner adequate protection of magnesium, inasmuch as all coatings applied would either be insufficiently hard and mar resistant, or else they would not be firmly adherent under all conditions but on prolonged use would either peel or become undercut by corrosion, so as to ultimately lose their utility.

The present invention has as an object a new means for protecting magnesium.

Another object is a new type of highly adherent coatings for metal objects.

Another object is a novel coating system and a metal protected thereby.

Another object is a novel coating process and a novel adhesion process for certain specific coating metal systems.

Further objects will become apparent from the following detailed description in which it is our intention to illustrate the applicabilty of the invention without thereby limiting its scope to less than that of all those equivalents which will be apparent to one skilled in the art.

In accordance with our invention, we apply to an oxidizable metal surface, such as magnesium or aluminum, a coating system consisting of an organic titanate, and a coating selected from the group consisting of alkyd phenolic primers containing zinc chromate, polyurethanes, or siloxanes, and subsequently expose the system to ionizing irradiation.

Although examples illustrate certain specific ingredients, the invention is by no means confined to these ingredients. Instead of the specific titanates mentioned for use in the organic titanate coating, we may also use tetra isopropyl titanate, titanium stearate, titanium oleate, titanium tall oil acylate, titanium cocoanut acylate, titanium linseed acylate, dibutyl diamyl titanate, methyl tributyl titanate, titanium acetyl acetonate, tetrabutyl titanate, acetylene glycol titanate, allyl butyl dimethyl titanate, and generally substances covered by the generic formula

where R is either an alkyl or aryl radical, and the $R_1$ is either the alkyl or aryl radicals, or hydrogen.

The resin coating composition may be for example, a polyurethane, siloxane, alkyd phenolic resins which may contain pigments such as for example red lead, zinc oxide, zinc phosphate or zinc chromate, a polyethylene, a vinyl compound such as vinyl acetate, an acrylate compound such as acrylate or methacrylate, polystyrene, acrylonitrile, or copolymer thereof. Thermoplastic as well as thermosetting resins may be used so long as hardness is adequate to permit extensive mechanical usage, though for best results it is desired that some free hydroxyl groups be present in the resin.

We prefer to apply the titanium coating first, followed by the resin coating or, when the titanate is compatible with the resin solution, to premix the two.

In the resin coating on a dry solids basis, we prefer to use between 0.5 and 10% of the titanate and between 90 and 99.5% of the plastic resin; however the use of from .1 to 50% of the titanate and 50 to 99.9% of the plastic is permissible.

Regarding the extent of irradiation necessary, we find appreciable adhesion increases attained with 2 megareps. (one megarep.=one million reps.) and some improvement occurs with 1 megarep., but for optimum results we use between 5 and 25 megareps. With styrene coatings up to 40 megareps. may be used.

The application of coating may be made by the conventional spray, brush or knife methods and the coatings are cured to their specific temperature demands.

The Dow Corning Corporation resins DC-803 and DC-804 are used in our experiments. These resins consist of the following organosiloxane units: dimethylsiloxane, phenylmethylsiloxane, monomethylsiloxane. The above ingredients are copolymerized by first forming a mixture of halides or esters which is then cohydrolyzed and co-condensed. In order to use the copolymer for coating composition, the condensation and polymerization must be stopped before completion so sufficient residual hydroxyl groups are present.

The invention is illustrated by the following specific examples:

Example 1

A sheet of magnesium metal is dipped in a 3% solution of tetra-2-ethyl hexyl titanate in benzene and air dried. Subsequently the same sheet is coated with a solution of alkyd phenolic primer containing zinc chromate such as Military Spec. P-6889A primer. The coated magnesium sheet is then air dried for 8 hours and is exposed to 5 megareps. of gamma irradiation from a Van de Graaff generator. The resultant coating is very firmly adherent to the magnesium, and on testing is found to be superior to the same non-irradiated coating.

Example 2

A sheet of FS-1 H-24 magnesium alloy forged as a belt buckle is dipped in a 5% solution of tetra butyl titanate in anhydrous isopropanol and is allowed to air dry. Subsequently, the same buckle is coated with a polyurethane formulation. The formulation is prepared by heating 139.2 grams of m-tolylene diisocyanate to 100° C. to which is added 80 grams of polyethylene glycol 200 slowly and with stirring. Polyethylene glycol 200 is a polyethylene glycol having a molecular weight of 200 and produced by Union Carbon & Carbide. The resultant mixture is heated at 150° C. for 5 minutes and then is cooled to 80° C., after which 88 grams of ethylene dichloride and 64 grams of methyl isobutyl ketone is added. A catalyst consisting of 30 grams of Triol 230, which is a polyethylene with 3 available hydroxyls, is added and the coated metal is dipped into this solution and air dried for ½ hour and after this treatment, the coated article is heated at 110° C. for ½ hour, and a second coat is applied and is cured in a similar fashion.

The resultant coating is exposed to 6 megareps. irradiation from a Van de Graaff generator. The coating is firmly adherent, and is superior to either the same coating treatment without irradiation, or to the same treatment omitting the titanate.

Example 3

A cooking utensil forged from magnesium alloy is coated with a siloxane composition consisting of 200 grams of siloxane DC-804 mixed with 3.6 grams of 6% cobalt naphthenate, 4.0 grams of tetra-2-ethyl hexyl titanate, and 25.0 grams of methyl isobutyl ketone. The resultant coating on the cooking utensil is air dried for 1 hour and after this treatment, the coated utensil is heated at 60° C. for 1 hour, at 120° C. for ½ hour and at 200° for 1 hour.

The resultant coating is exposed to 6 megareps. irradiation from a Van de Graaff generator. The resultant coating is superior to either the same coating without irradiation, or to the same treatment omitting the titanate.

*Example 4*

A sheet of magnesium metal is coated with a siloxane composition consisting of 200 grams of siloxane DC–804 mixed with 3.6 grams of 6% cobalt naphthenate, 4.0 grams of titanium linseed acylate and 25.0 grams of methyl ethyl ketone. The resultant coating on the magnesium metal is air dried for 1 hour and after this treatment the coated article is heated at 60° C. for 1 hour, at 120° C. for ½ hour and at 200° C. for 1 hour.

The resultant coating is exposed to 8 megareps. irradiation from a Van de Graaff generator. The resultant coating is superior to either the same coating without irradiation, or to the same treatment omitting the titanate.

While we prefer to use a Van de Graaff generator for the ionizing irradiation, we may also use a cobalt-60 source, X-ray or the like. The Van de Graaff generator is a source of beta rays and only a few alpha rays. These are the most efficient for the shallow penetration necessary for coatings and are the most economical. The cobalt–60 source and the X-ray are sources of gamma rays and would be used where deep penetration is necessary.

It is believed that a reaction takes place in which there is a cross-linking with hydroxyl containing polymers and hydroxyl or oxide groups on the metal surfaces by means of the titanates, and that this cross-linkage is promoted by the free radicals formed in ionizing irradiation bombardment.

It is thus seen that the preferred metals are metals which are coated with an oxide coating, although a superimposed phosphate or chromate coating may serve the same purpose. Examples of such metals are aluminum, magnesium, beryllium or titanium.

It is thus seen that the invention is capable of considerable variation, and it is not to be limited excepting by the claims, in which it is our intention to cover all novelty inherent to this invention as broadly as possible, in view of prior art.

Having thus disclosed our invention, we claim:

1. An article of manufacture comprising a magnesium surface having thereon a composite coating comprising a first layer and a second layer; said first layer comprising an organic titanate, said second layer comprising a film-forming organic polymeric synthetic resin, said article characterized by having been exposed to from 1 to 50 megareps. of ionizing irradiation.

2. A method for bonding a protective coating comprising an intermediate layer of a titanate and an outer layer of a hydroxy containing organic polymeric synthetic resin to a metal by the use of ionizing irradiation of an intensity exceeding 1 megarep.

3. The method according to claim 2, wherein said material is a magnesium metal.

4. The method according to claim 2, wherein the intensity of said ionizing irradiation is from about 5 to 25 megareps.

5. An article of manufacture, comprising a metal surface having thereon a composite coating comprising a first layer and a second layer; the said first layer comprising a titanate having the generic formula

where R is selected from the group comprising alkyl and aryl radicals and $R_1$ is selected from the group comprising alkyl and aryl radicals and hydrogen; said second layer comprising an organic polymeric synthetic resin; said layers being chemically joined to each other and to the metal respectively, said chemical joining having been accomplished by exposing coated article to ionizing irradiation in excess of 1 megarep., said titanate comprising between 0.1 and 50% of the combined coating weight.

6. An article of manufacture according to claim 5, wherein said metal surface is a magnesium metal.

7. An article of manufacture, comprising a metal surface having thereon a composite coating comprising a first layer and a second layer; said first layer comprising a titanate having the generic formula

where R is selected from the group consisting of alkyl or aryl radicals and $R_1$ is selected from the group consisting of alkyl and aryl radicals, and hydrogen; said second layer comprising an organic polymeric synthetic resin, said article characterized by having been exposed to ionizing irradiation in excess of 1 megarep., said titanate comprising between 0.5 and 10% of the combined coating weight.

8. An article of manufacture according to claim 7, wherein said surface is a magnesium metal.

References Cited in the file of this patent

UNITED STATES PATENTS

| | | |
|---|---|---|
| 1,946,647 | Taylor et al. | Feb. 13, 1934 |
| 2,418,935 | Hutchinson | Aug. 15, 1947 |
| 2,541,027 | Bradley | Feb. 13, 1951 |
| 2,643,984 | Boyd | June 30, 1953 |
| 2,668,133 | Braphy et al. | Feb. 2, 1954 |
| 2,680,723 | Kronstein | June 8, 1954 |
| 2,709,569 | Roush | May 31, 1955 |
| 2,733,222 | Beacham | Jan. 31, 1956 |
| 2,763,609 | Lewis et al. | Sept. 18, 1956 |
| 2,811,471 | Homeyer | Oct. 29, 1957 |

OTHER REFERENCES

Paint, Oil and Chem. Review, June 21, 1951, pages 12, 40, and 41.

Modern Plastics, vol. 32, September 1954, pages 141–144, 146, 148, 150, 220–223, 236–238.